(12) United States Patent
Sporn

(10) Patent No.: US 9,668,458 B2
(45) Date of Patent: Jun. 6, 2017

(54) DOG HARNESS

(71) Applicant: Joseph S Sporn, New York, NY (US)

(72) Inventor: Joseph S Sporn, New York, NY (US)

( * ) Notice: Subject to any disclaimer, the term of this patent is extended or adjusted under 35 U.S.C. 154(b) by 50 days.

(21) Appl. No.: 14/477,597

(22) Filed: Sep. 4, 2014

(65) Prior Publication Data

US 2016/0066544 A1 Mar. 10, 2016

(51) Int. Cl.
*A01K 27/00* (2006.01)
(52) U.S. Cl.
CPC .................................. *A01K 27/002* (2013.01)
(58) Field of Classification Search
CPC .............. A01K 27/00; A01K 27/002
USPC ................... 119/792, 793, 856, 863
See application file for complete search history.

(56) References Cited

U.S. PATENT DOCUMENTS

| | | | | |
|---|---|---|---|---|
| 2,187,021 A * | 1/1940 | Everson | ............... | A01K 27/002 119/792 |
| 2,233,397 A * | 3/1941 | Bloom | ................ | A01K 27/002 119/857 |
| 2,605,744 A * | 8/1952 | Urbanski | ............. | A01K 27/002 119/856 |
| 3,768,445 A * | 10/1973 | Sorrels | ................. | A01K 27/002 119/856 |
| 5,150,667 A * | 9/1992 | Salidrigas | ............ | A01K 27/002 119/863 |
| 5,247,905 A * | 9/1993 | Arakawa | .............. | A01K 27/002 119/863 |
| 5,427,061 A * | 6/1995 | McCullough | ........ | A01K 1/0263 119/771 |
| 5,915,335 A * | 6/1999 | Holt, Jr. | ............... | A01K 1/0263 119/770 |
| 6,101,979 A * | 8/2000 | Wilson | ................. | A01K 27/002 119/725 |
| 6,213,057 B1 * | 4/2001 | Franco | ................. | A01K 27/002 119/793 |
| 6,637,377 B2 * | 10/2003 | Lobanoff | ............. | A01K 1/0263 119/770 |
| 6,662,755 B2 * | 12/2003 | Kato | ..................... | A01K 27/002 119/856 |
| 2008/0047501 A1 * | 2/2008 | Madere | ................ | A01K 27/002 119/863 |
| 2008/0223311 A1 * | 9/2008 | Ito | ........................ | A01K 27/002 119/792 |

* cited by examiner

*Primary Examiner* — David Parsley
(74) *Attorney, Agent, or Firm* — Hanes & Bartel LLC

(57) ABSTRACT

A dog harness comprising, an open ended prosternum loop and an open ended sternum loop that are angularly interconnected so as to form first and second harness apexes adapted to be positioned over the shoulders of a dog, first and second web loops attached to the respective first and second apexes, each having a slip buckle for adjusting the size of the loop, and a single side release buckle slidingly engaging the first and second web loops for interconnecting the loops over the dog's withers.

2 Claims, 3 Drawing Sheets

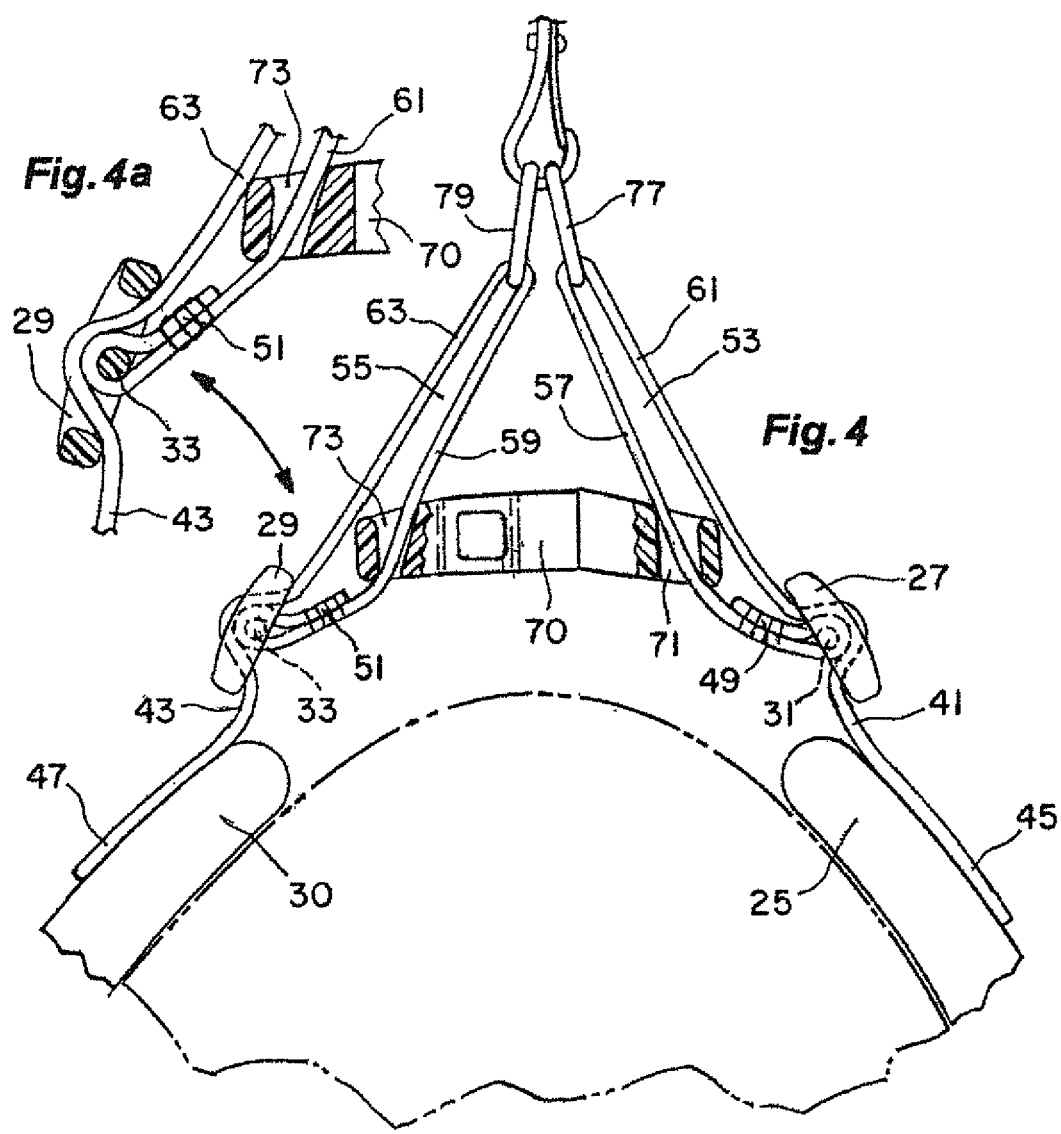
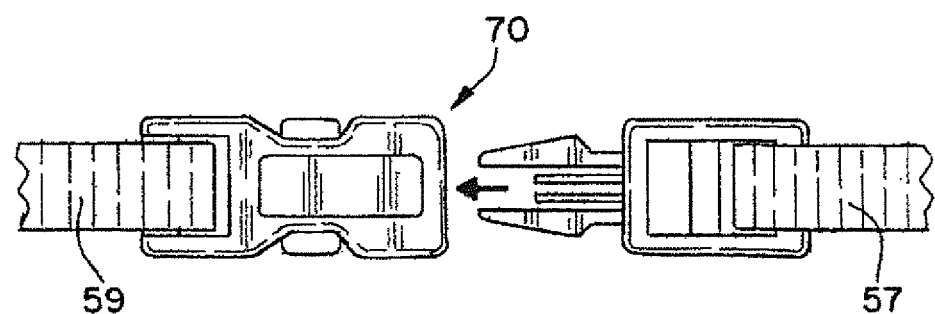

DOG HARNESS

The present invention relates to small animal harnesses that comprise prosternum and sternum bands, the interconnected ends of which form apexes that are interconnected with webbing loops and a fastener over the dog's withers.

BACKGROUND

Broadly, the type of dog harness that is the subject of the present invention is known but it is the object of the present invention to improve on the fastener assembly that interconnects the side portions of the harness over the dog's withers in order to accommodate dogs of varying shoulder breadth and to provide a greater range of tightness of fit depending on the pulling force exerted by the dog on the leash.

DESCRIPTION OF THE DRAWINGS

FIG. 4 is a fragmentary cross sectional view of the fastener assembly that interconnects the two side apexes of the harness.

FIG. 4a is an enlarged fragmentary cross sectional view of the sliplock buckle and the connecting end of the side release buckle together with the web member that forms one side of the fastener assembly.

FIG. 5 is a fragmentary top view of the male and female ends of the side release buckle that interconnects the webs.

DETAILED DESCRIPTION

Figure 1:
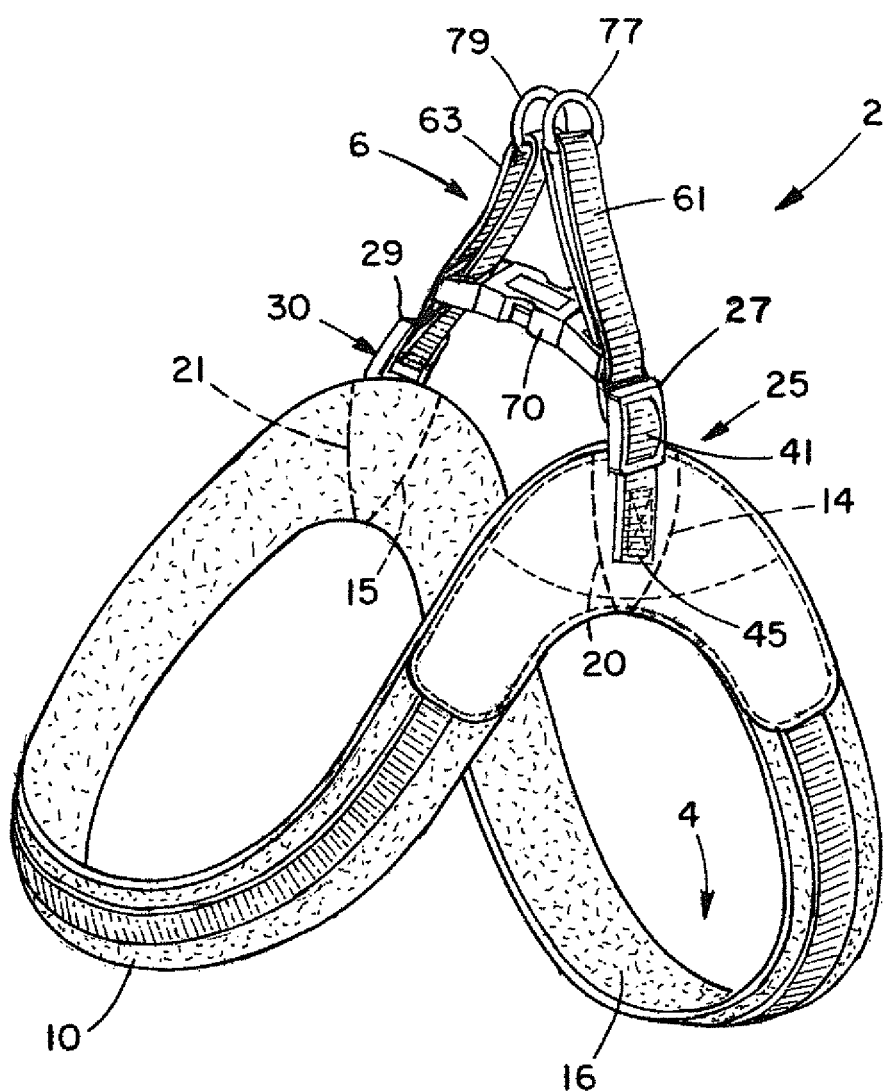
FIG. 1 is a perspective view of the dog harness of the present invention.

The dog harness 2 of the present invention includes a body portion 4 and the fastener assembly 6, as seen in FIG. 1.

The body portion includes a strap or band 10 that is adapted to be positioned over the dog's prosternum 12 with ends 14 and 15 that terminate over the dog's shoulders. The body portion also includes a strap or band 16 that is adapted to be positioned around the dog's sternum 18 with ends 20 and 21 that terminate over the dog's shoulders. The ends 14 and 20 of the straps 10 and 16 that terminate over the left shoulder are interconnected at an angle forming a first harness apex 25. The ends 15 and 21 of the straps 10 and 16 that terminate over the right shoulder are interconnected at an angle forming a second harness apex 30.

The fastener assembly 6 includes first and second web members 41 and 43 each having proximal ends 45 and 47 and distal ends 49 and 51, the proximal ends of which are sewn or otherwise attached to the respective harness apexes 25 and 30. Each of the web member[s ]traverses the open spaces of sliplock buckles 27 and 29, the middle bars 31 and 33 of which, anchor the distal ends 49 and 51 of the web members. Between the distal ends of each of the web members and the point where the web members traverse the sliplock buckles loops 53 and 55 are formed each having inner 57 and 59 and outer 61 and 63 runs. Adjusting the positions of the sliplock buckles on the web members regulates the size of the loops.

Figure 2:
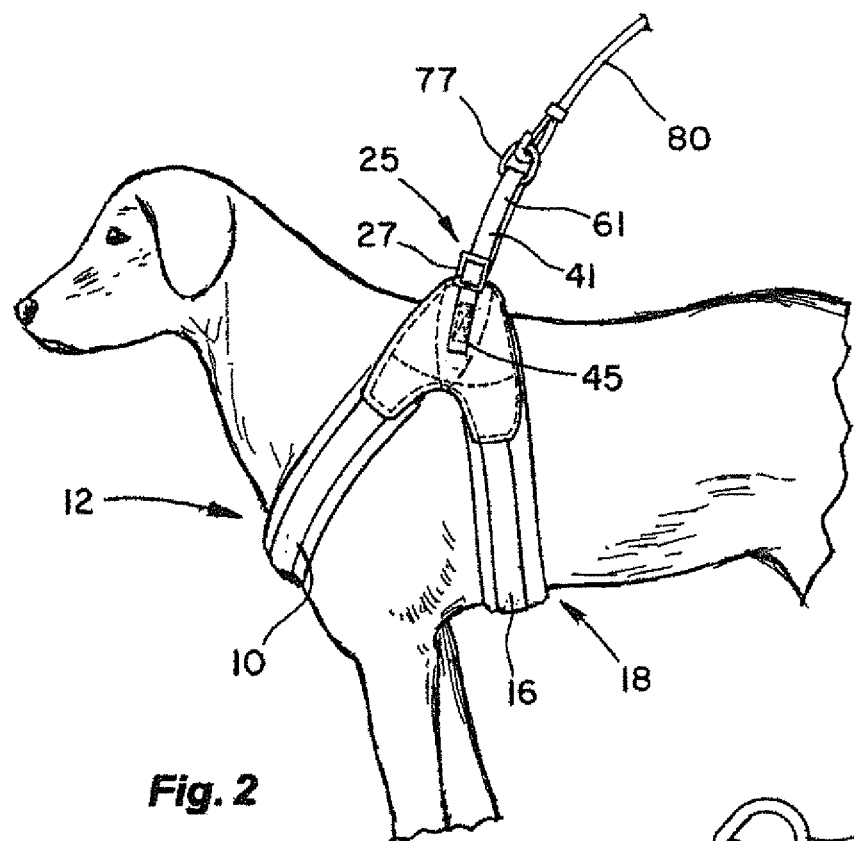
FIG. 2 is a fragmentary side view of a dog wearing the harness of the present invention.
Figure 3:
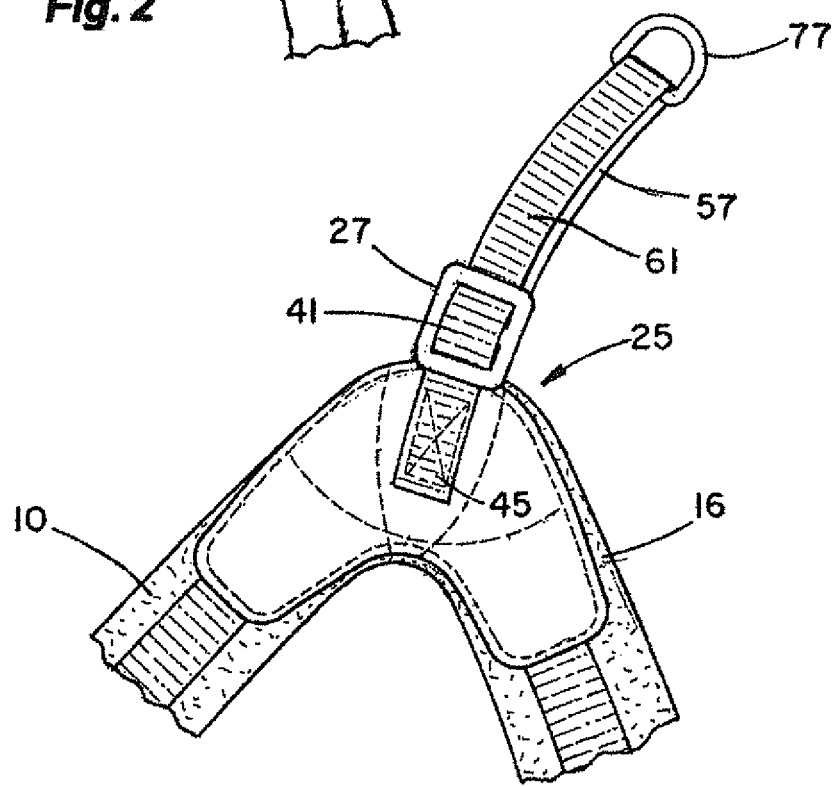
FIG. 3 is a fragmentary side view of one side apex of the harness and the attached web member that forms a loop above the point of attachment.

The web members 41 and 43 are interconnected with a side release buckle 70 where the inner runs 57 and 59 pass through the respective connecting slots 71 and 73 in the ends of the buckle. The spacing and fit between the web members and the side buckle's connecting slots is such that the buckle can freely slide on the inner runs of the web members. That portion of each of the web members that form the loops 53 and 55 traverses through respective D-rings 77 and 79 in such a manner that the rings can freely slide on the loop portions of the web members, easily accommodating changes in the size of the loops. The D-rings are intended as the anchor points for connecting a leash 80, as shown in FIG. 2.

It can be seen that positioning the sliplock buckles 27 and 29 in the position shown in FIG. 1 will result in spacing between the harness apexes 25 and 30 that is closer together than if the sliplock buckles are raised on the web members to decrees the size of the loops.

In operation on a dog, the disclosed fastener assembly allows for simple and fixed adjustment of the spacing between the harness apexes but that spacing will not vary as a function of tension on the leash.

I claim:

1. A dog harness comprising,
   an open ended prosternum flexible loop having first and second terminal ends,
   an open ended sternum flexible loop having first and second terminal ends where the first end of the sternum loop is angularly affixed to the first end of the prosternum loop forming a first apex and the second end of the sternum loop is angularly affixed to the second end of the prosternum loop forming a second apex,
   first and second sliplock buckles each having a middle bar and opposed openings on each side of the middle bar,
   a first elongated web member having distal and proximal ends, where the proximal end traverses the openings of the first sliplock buckle to a position of attachment to the first apex and the web forms a closed loop having inner and outer runs where the distal end of the first web member is attached to the middle bar of the first sliplock buckle,
   a second elongated web member having distal and proximal ends, where the proximal end traverses the openings of the second sliplock buckle to a position of attachment to the second apex and the web forms a closed loop having inner and outer runs where the distal end of the second web member is attached to the middle bar of the second sliplock buckle,
   a side release buckle slidingly interconnecting the inner runs of the first and second closed loop web members, and
   first and second D rings slidingly entrapped within the respective first and second closed loop web members.

2. A dog harness comprising,
   an open prosternum loop having first and second ends,
   an open sternum loop having first and second ends,
   left and right inverted V shaped shoulder covering apexes each respectively formed by angularly interconnecting the first end of the prosternum loop and the first end of the sternum loop and angularly interconnecting the second end of the prosternum loop and the second end of the sternum loop,
   a fastener assembly comprising,
     first and second web members each having proximal and distal ends,
     a sliplock buckle having a middle bar carried by each of the web members, where the proximal ends of the web members are secured to the respective apexes and where the web members each form a web loop having inner and outer runs and where the distal ends of the web members are secured to the middle bars of the respective sliplock buckles, a side release buckle slidingly interconnecting the inner runs of the first and second web members at a point intermediate the closed end of the web loop and the sliplock buckle.

\* \* \* \* \*